United States Patent [19]

Chao et al.

[11] 4,007,729
[45] Feb. 15, 1977

[54] MEANS OF INCREASING EFFICIENCY OF CPC SOLAR ENERGY COLLECTOR
[75] Inventors: Bei Tse Chao, Urbana; Ari Rabl, Downers Grove, both of Ill.
[73] Assignee: The United States of America as represented by the United States Energy Research and Development Administration, Washington, D.C.
[22] Filed: June 27, 1975
[21] Appl. No.: 590,980
[52] U.S. Cl. .................. 126/271; 126/270
[51] Int. Cl.² .................. F24J 3/02
[58] Field of Search ............ 126/271, 270; 237/1 A
[56] References Cited
UNITED STATES PATENTS

| 980,505 | 1/1911 | Emmet | 126/271 |
|---|---|---|---|
| 2,907,318 | 10/1959 | Awot | 126/271 |
| 3,866,285 | 2/1975 | Clark | 126/271 |
| 3,929,122 | 12/1975 | Alkasab | 126/271 |

Primary Examiner—Kenneth W. Sprague
Attorney, Agent, or Firm—Dean E. Carlson; Arthur A. Churm; Paul A. Gottlieb

[57] ABSTRACT

A device is provided for improving the thermal efficiency of a cylindrical radiant energy collector. A channel is placed next to and in close proximity to the nonreflective side of an energy reflective wall of a cylindrical collector. A coolant is piped through the channel and removes a portion of the nonreflective energy incident on the wall which is absorbed by the wall. The energy transferred to the coolant may be utilized in a useful manner.

7 Claims, 5 Drawing Figures

U.S. Patent  Feb. 15, 1977  Sheet 1 of 2  4,007,729
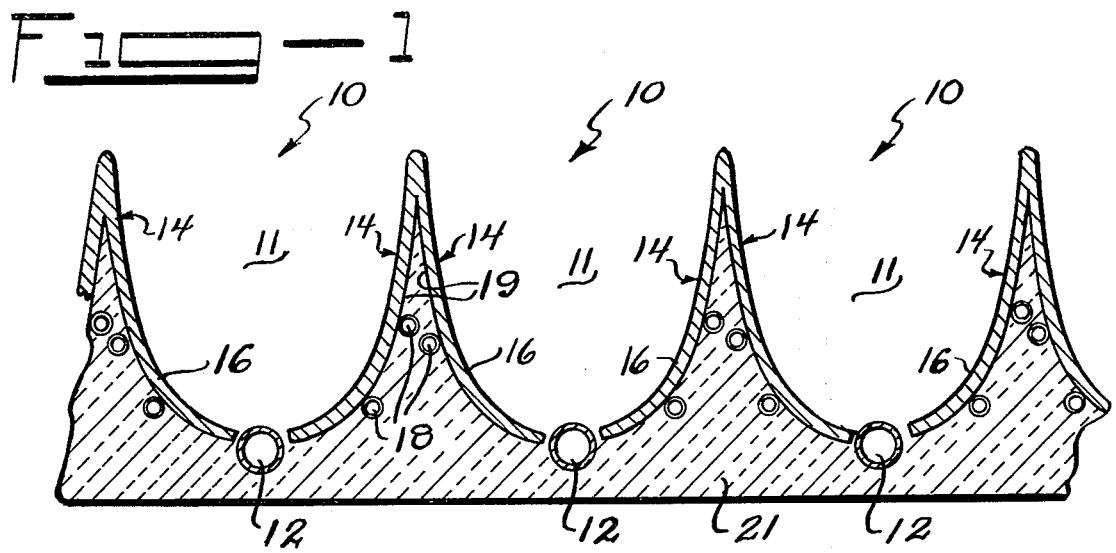
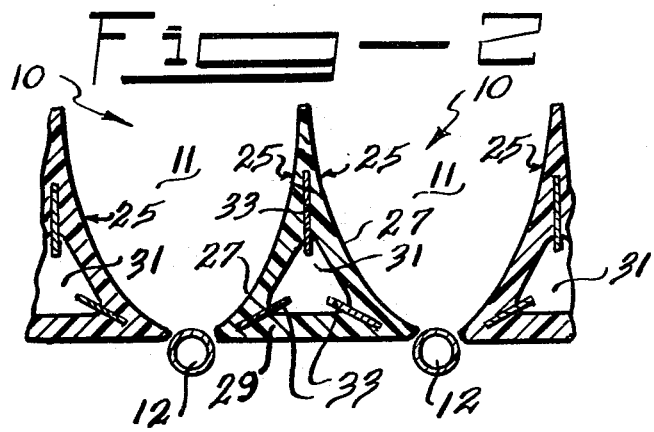
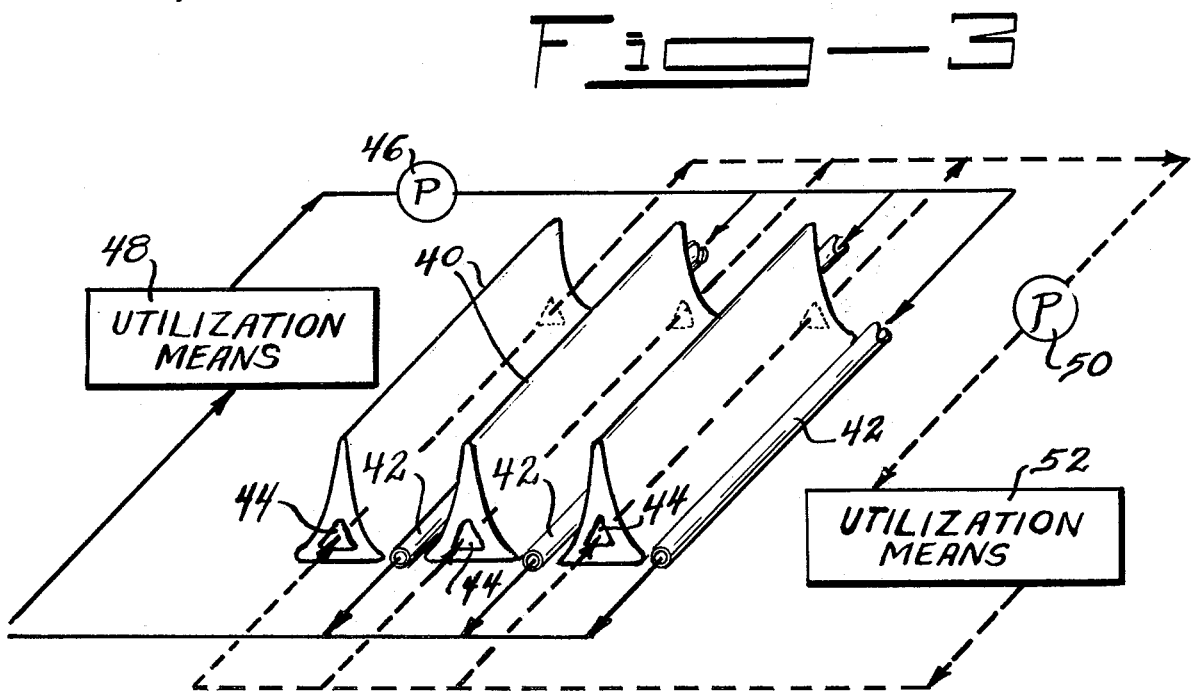

MEANS OF INCREASING EFFICIENCY OF CPC SOLAR ENERGY COLLECTOR

CONTRACTUAL ORIGIN OF THE INVENTION

The invention described herein was made in the course of, or under, a contract with the United States Energy Research and Development Administration.

BACKGROUND OF THE INVENTION

Cylindrical radiant energy collectors are trough-like structures which concentrate energy incident on the entrance aperture within a certain angular acceptance onto a smaller area at the exit aperture. The structure usually includes opposed reflective walls which direct energy incident thereon within the acceptance angle, out the exit aperture or onto an energy absorber at the exit aperture. Such a collector is described in a prior U.S. application for a RADIANT ENERGY COLLECTOR, Ser. No. 492,074, filed July 25, 1974, and in a publication, *Solar Energy*, Vol. 16, No. 2, pages 89–95, (1974). Such collectors may be arranged in a planar array as shown in FIG. 10 of the Ser. No. 492,074 application. Since the reflective surfaces, no matter how carefully they are made, are not perfect mirrors, a portion of the energy incident on the reflective side walls is absorbed into the wall, either into the substrate which may support the reflective surface of the wall or into the reflecting material itself. For example, a typical aluminum-faced mirror would reflect, on the average, 80–85 percent of the incident radiation, the remaining energy being absorbed in the form of heat and the temperature of the reflective wall will rise. This absorbed heat is usually dissipated by radiation and natural convection and is thereby lost to the ambient environment. This loss lowers the thermal efficiency of the collector.

Further, on hazy or cloudy days, a greater portion of the energy incident on the side walls falls outside the acceptance angle of the collector. Such radiation undergoes a multiple reflection between the opposed reflective walls before being directed out the entrance aperture. This multireflection increases the temperature of the reflective walls, but this energy is lost through radiation and convection. Present means for reducing the amount of heat absorbed by the walls involves improving the quality of the mirrors to lessen the amount of energy absorbed. However, the added expense for improved mirrors negates the improved collector efficiency.

It is therefore an object of this invention to improve the thermal efficiency of cylindrical energy collectors.

Another object of this invention is to provide a means for removing heat absorbed by the reflective walls of the cylindrical collector.

Another object of this invention is to reduce the quality of mirrors required for cylindrical energy collectors.

SUMMARY OF THE INVENTION

The thermal efficiency of a cylindrical radiant energy solar collector is improved by a device for removing radiant energy incident on the reflective side walls of the collector and absorbed by the walls. The device includes a channel positioned in close proximity to the nonreflective side of the reflective walls of the collector and running the length of the side wall parallel thereto. One channel positioned in the nonreflective region between two adjacent collectors is also satisfactory. A coolant is pumped through the channel and removes incident energy absorbed into the nonreflective region. This energy can be utilized directly or the channel may be serially coupled to the main collector absorber to serve as a preheater for the fluid in the main absorber.

BRIEF DESCRIPTION OF THE DRAWINGS

FIG. 1 is a transverse cross section of one embodiment of the device;

FIG. 2 is a transverse cross section of another embodiment of the device;

FIGS. 3, 4 and 5 show arrays of trough-shaped collectors utilizing the invention.

DETAILED DESCRIPTION OF THE PREFERRED EMBODIMENT

Figure 4:
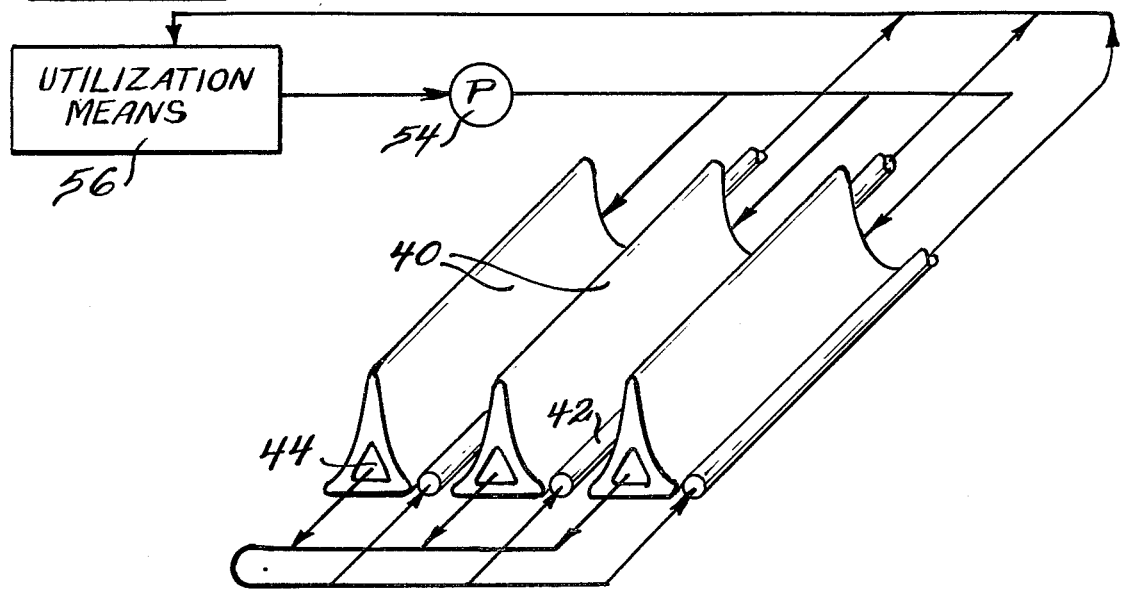

Referring to FIG. 1 and FIG. 2, there is shown the transverse cross section of means for improving the thermal efficiency of cylindrical radiant energy collectors. The cylindrical collector is a trough-like device whose structure is formed by extending the cross sections shown in FIG. 1 or FIG. 2 along an axis perpendicular to the plane of the cross section to form a trough-like structure as will be described with reference to FIGS. 3–5. The function of the collector is to concentrate radiant energy impinging within a given acceptance angle upon entrance aperture 10 of each collector 11 onto the surface of an energy absorber 12. Here there is shown a plurality of collectors positioned side by side. The device may also be utilized with a single collector. The energy absorber 12 may be, for example, a pipe containing fluid, a photovoltaic cell, or any other type of energy receiver responsive to radiant energy. Each collector includes opposing walls which direct energy incident upon the entrance aperture 10 within a particular angle onto the absorber 12. Note that rays of energy not incident within the particular angle are generally after multireflection directed out at entrance aperture 10. The actual generation of the contours of the side walls may be according to the method found in U.S. application for RADIANT ENERGY COLLECTOR, Ser. No. 492,074, filed July 25, 1974, or in a publication, *Solar Energy*, Vol. 16, No. 2, pages 89–95, (1974) or any other method for developing side wall contour in a cylindrical collector.

Referring to FIG. 1, the side walls 14 include one side 16 of each wall 14 upon which the radiant energy is incident which is of a reflective material such as aluminum or silver. Since all reflective surfaces, no matter how carefully made, are not perfect mirrors, a portion of the energy incident on side 16 of each wall 14 is absorbed into the wall. If the side wall is simply formed of thin metal plate bent to the desired contour as shown in FIG. 1, the heat is absorbed by the metal of wall 14.

The removal of heat absorbed by the metal wall 14 and not reflected is facilitated by attaching smaller tubes 18 to the side 19 of wall 14, the nonreflective side 19 being opposite reflective side 16. The attachment of the tubes should be with good thermal contact and material forming the walls of the tubes should also be a good heat conductor. Copper or brass tubes soldered to surface 19 are satisfactory for the embodiment shown in FIG. 1. A heat transfer fluid is made to flow through tubes 18 and removes heat transferred to tubes 18 from walls 14. Air or water or any other well-known coolant is satisfactory. As the tubes 18 on surface 19 will radiate some of the absorbed heat, a generous amount of insulating material 21, for example, a urethane foam, may be disposed in the region between walls 14 defined by opposing surfaces 19.

Referring to FIG. 2, the side walls 25 include one side 27 upon which the radiant energy is incident. Here the reflective surface is deposited upon a substrate having the desired contour which provides the necessary structural support to maintain the contour. For example, such a wall could be formed by vacuum deposition of aluminum which acts as reflective surface 27, upon a plastic substrate 29. The removal of heat absorbed by walls 25 and not reflected is facilitated by providing a hollow passage 31 in substrate 29. The passage may be of any shape and can be produced as part of the process of forming the solid substrate. As in FIG. 1, a heat transfer fluid or coolant is made to flow in hollow passage 31 for removal of heat absorbed by wall 25. Where substrate 29 is of low heat conductivity material, it may be necessary to provide a heat conductive path from the tip regions remote from passage 31. One means for providing such a path is to provide metal plates 33 extending from the remote tip regions to the interior of passage 31. Such plates should be of high conductive material such as aluminum and may be inserted into substrate 29 during the forming process of substrate 29.

Figure 5:
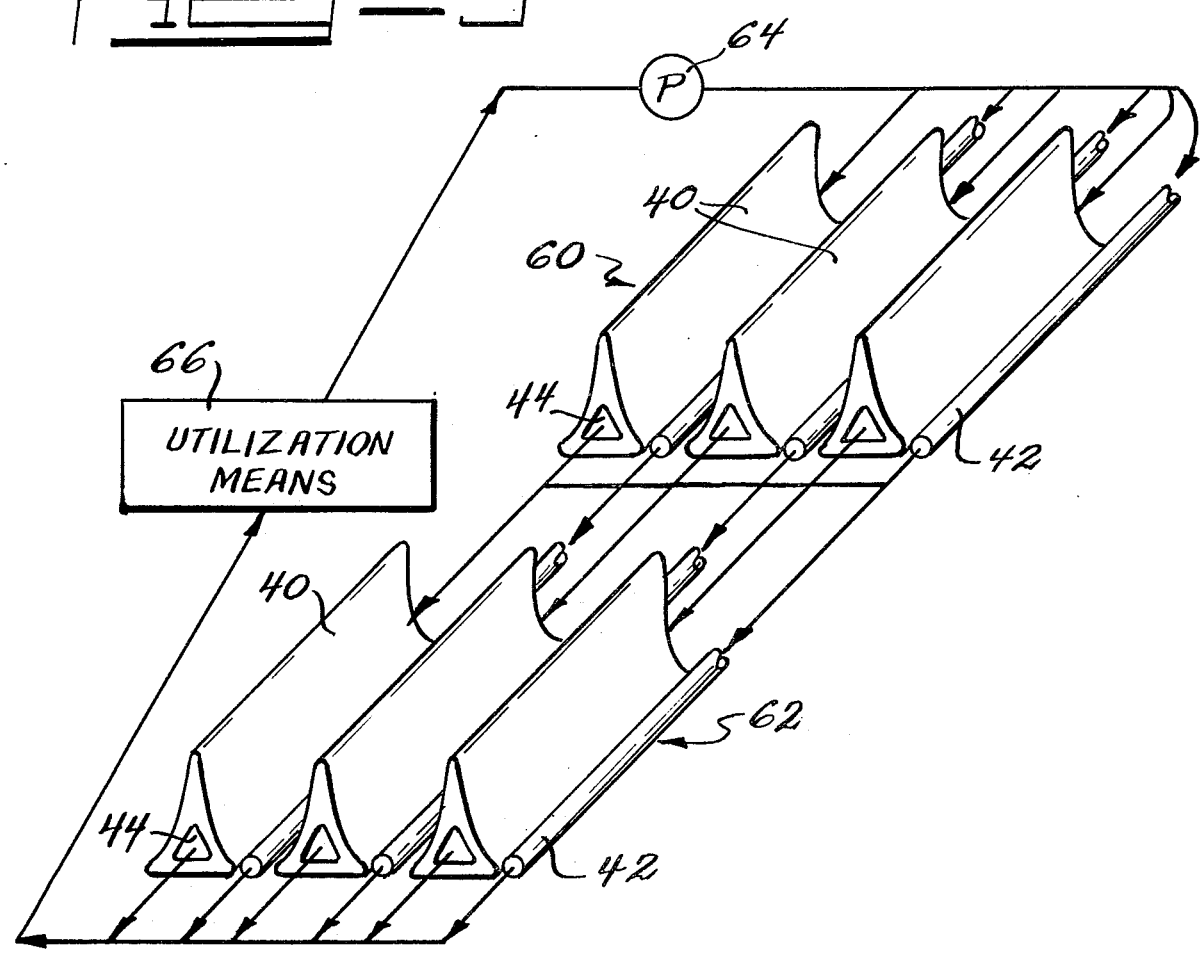

Utilization of the heat obtained from the energy absorbed by the mirrors can be by numerous means including those shown in FIG. 3, FIG. 4, and FIG. 5. In each FIG. 3–5, there is shown an array of trough-shaped collectors 40. Each collector has a transverse cross section which is extended along an axis perpendicular to the cross section to form a trough-like cylindrical collector. At the exit aperture of each collector is a primary energy absorber 42. In each FIG. 3–5 the absorber 42 is shown as one of the type which has a fluid flowing through it to carry away the concentrated heat. Each array of collectors 42 is provided with secondary heat removal tubes 44 for removing heat absorbed by the side walls of collector 40 as previously described with reference to FIG. 1 and FIG. 2. The heated fluids from the primary and secondary heat removal means can be utilized separately or in a cooperative manner. In FIG. 3 the utilization is separate. Thus, primary absorbers 42 are coupled together and fluid is pumped through them by pump 46 and heat from the primary fluid is utilized by utilization means 48. The secondary heat removal tubes 44 are coupled together and fluid is pumped through them by pump 50 and heat from the secondary fluid is utilized by utilization means 52. This separate arrangement might be advantageous where the incoming primary fluid has a relatively high temperature such as where utilization means 48 is an absorption air-conditioning system. The utilization means 52 might advantageously use the secondary fluid for a different purpose, such as hot water preparation. Note that if primary absorber 42 is a non-fluid system, such as a photovoltaic cell, the separate utilization of the secondary fluid as shown in FIG. 3 would be applicable.

In FIG. 4 tubes 44 and the primary absorbers 42 are serially coupled so that the secondary tubes 44 serve as preheaters. Fluid is pumped first to the secondary tubes 44 and then to the primary absorbers 42 by pump 54 and heat from the common fluid is utilized by utilization means 56. This configuration might be advantageously used where utilization means 56 provides for domestic space heating.

In FIG. 5 a multistaging system is shown. Where high temperature output is desired with collectors of low concentration, the output of a first stage low concentration array 60 of collectors 40 is utilized to preheat the fluid inputted to a second stage low concentration array 62. Fluid is pumped through both the primary absorbers 42 and secondary tubes 44 of array 60 and then through the primary absorbers 42 and secondary tubes 44 of array 62 by pump 64 and utilized by utilization means 66. The advantage of multistaging to obtain higher temperatures is that the collectors 40 of each array require less stringent tracking and alignment than a single array of higher concentration collectors.

Of course, other arrangements would be apparent as the added heat obtained from absorbed energy increases the design possibilities of nonimaging collectors. The size of the pipes and flow rates are determined by the design temperatures and heat removal rates. Note that the percentage of heat absorbed by the walls in comparison to that absorbed by the primary absorber tube increases on cloudy or hazy days when energy outside the acceptance angle will be a greater proportion of absorbed heat. Thus, on cloudy or hazy days the overall efficiency of the device will be increased with the additional availability of heat absorbed by the reflective walls.

The system herein disclosed has the advantage of reducing the need for expensive high quality mirrors since radiation absorbed by the mirror surface, which is a function of mirror quality, is utilized rather than dissipated. Since the mirror surface temperature is reduced, overall radiation and convection loss is reduced and structurally there will be a lessened tendency for the mirrors to lose their shape as they are heated up. For collectors with their optical axis inclined at a sufficiently large angle with the vertical direction, the local heat loss at the receiver's surface by natural convection would become less serious since the warmer air leaving the absorber will have an opportunity of mixing with the cooler air level adjacent to the mirror surface before it eventually loses heat to the environment.

The embodiments of the invention in which an exclusive property or privilege is claimed are defined as follows:

1. In a first cylindrical radiant energy collector having a primary energy absorber and a reflective wall extending parallel to a reference axis for directing incident radiation onto said absorber, the wall having a reflective side and a non-reflective side substantially opposed to the reflective side, a device for reducing the energy loss from the wall, comprising:

a channel aligned parallel to the reference axis and positioned on the same side of the wall as the non-reflective side of the wall, said channel containing a heat transfer fluid, pump means coupled to said channel for circulating said fluid through said channel, said channel being such distance from the wall that a portion of the energy incident on and absorbed by the wall is transferred to said fluid, said absorber absorbing energy directed thereto by said wall, said absorber includes a pipe coupled to said pump means, said pump means circulating said fluid through said channel and said pipe, said pipe being so positioned that a portion of the energy directed thereto by said wall is transferred to said fluid in said pipe, said utilization means being coupled to said pipe and thereby utilizing the heat transferred to said fluid in said channel and said pipe heat transferred to said fluid and absorbed by said absorber.

2. The device of claim 1 further including a second cylindrical radiant energy collector having conduit means through which a coolant may pass to remove heat collected by said second collector, said conduit means being coupled to said channel, said pipe, said pump means and said utilization means such that said fluid is pumped through said channel and said pipe to said conduit means and then to said utilization means by said pump means.

3. The device of claim 1 wherein said pump means pumps said fluid through said channel to said pipe and then to said utilization means, thereby said fluid being preheated in said channel prior to circulation through said pipe.

4. The device of claim 3 wherein the wall is formed of a metal plate bent to desired contour, and said channel includes a tube of a heat conductive material in thermal contact with the nonreflective side of the wall, said tube containing said fluid.

5. The device of claim 4 further including thermal insulation surrounding the nonreflective side of the wall and said tube for limiting radiative heat loss therefrom.

6. The device of claim 3 wherein the wall is formed of a reflective material deposited upon a substrate having the desired wall contour, said substrate having a passageway therein to form said channel, said passageway containing said fluid.

7. The device of claim 6 further including a heat conductive metal plate positioned within said substrate and extending into said passageway for providing a conductive heat path for heat absorbed by the wall to said passageway.

* * * * *